Oct. 9, 1951      E. G. GRUNDSTROM      2,570,228
ADJUSTABLE RELIEF VALVE FOR PRESSURE COOKERS
Filed Feb. 5, 1948
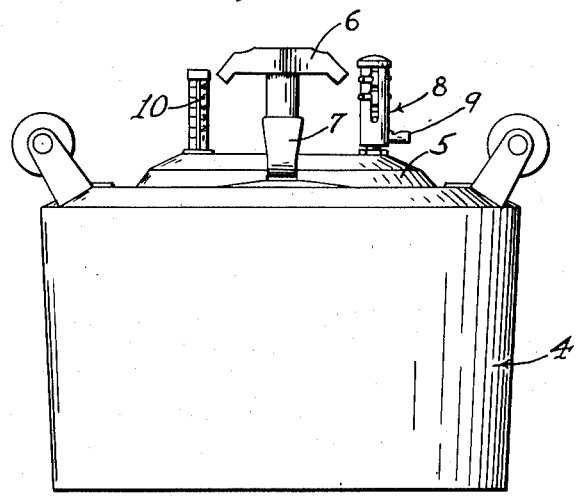
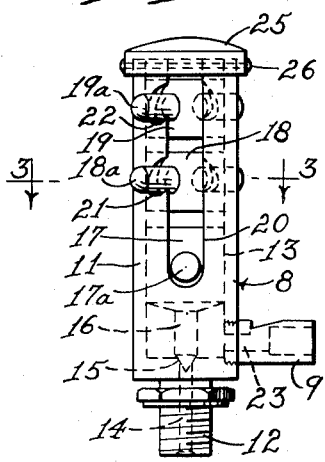
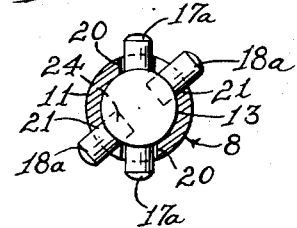
Inventor:
Erik G. Grundstrom Patented Oct. 9, 1951

2,570,228

UNITED STATES PATENT OFFICE 2,570,228

ADJUSTABLE RELIEF VALVE FOR PRESSURE COOKERS

Erik G. Grundstrom, Chicago, Ill., assignor to Advance Aluminum Castings Corp., Chicago, Ill., a corporation of Illinois Application February 5, 1948, Serial No. 6,393

7 Claims. (Cl. 137—53)

This invention relates to a new and improved relief valve for domestic pressure cookers and similar pressure receptacles.

The principal object of my invention is to provide, in a unitary assembly, a relief valve comprising a plurality of weights which may be used selectively in any one of a number of different combinations to weight the valve element accordingly and thus maintain whatever pressure is desired within the cooker.

The weights, in accordance with my invention, are all assembled in the tubular body of the valve and the lowermost one weights the valve element directly, the others above being provided with operating handles by means of which they, or as many of them as desired are arranged to be supported in the valve body, in raised retracted relationship to the lowermost weight, whereby the valve can be set quickly and easily to open at, say, five pounds steam pressure, when only the lowermost weight is in operative position, and open at, say, ten pounds pressure, when the second weight is added, and open at, say, fifteen pounds pressure, when the third weight is added.

The invention is illustrated in the accompanying drawing, in which—

Fig. 1 is a side view of a pressure cooker equipped with a relief valve made in accordance with my invention;

Fig. 2 is a side view of the relief valve removed from the cooker and shown on a larger scale, and Fig. 3 is a cross-section on the line 3—3 of Fig. 2.

The same reference numerals are applied to corresponding parts in these three views.

Referring to the drawing, the reference numeral 4 designates the receptacle or body of the pressure cooker, and 5 the removable cover therefor. The cover 5 is arranged to be clamped resiliently in closed position in the open top of the receptacle by means of a handle 6 and spring 7, the latter being turned by the handle to compress the gasket that is provided between the parts for a steam-tight seal. The housewife after placing the foodstuff to be cooked in the receptacle 4, sets the relief valve 8, either by experience or according to instructions, and then places the cooker over the gas burner or other source of heat. As the temperature rises within the cooker steam will, of course, be generated in the receptacle until the pressure is sufficient to open the valve 8. The steam escaping sounds a whistle 9 giving a warning to the housewife. Then, according to what I consider the preferred practice, the housewife will re-set the valve 8 for the highest possible pressure and remove the cooker from the source of heat. The valve 8 of my invention, as will soon appear, enables quicker and easier setting and resetting than previous designs of adjustable valves provided on pressure cookers. When the valve 8 is set for the highest pressure, as just mentioned, the pressure within the cooker will be maintained for a long time. After the cooker has been removed from the heat source and the food is subject to the existing temperature and pressure within the cooker for a certain length of time, which can be readily determined by simple experimentation with different foods being cooked, the housewife will open the valve 8 so that the steam pressure in the cooker is relieved and the cover 5 can be removed for access to the food. The present design, as will also appear soon, also enables easy opening of the valve, when that is necessary. The housewife, going by experience or instructions, knows that when she sets the valve 8 for a certain pressure the valve should open in a certain number of minutes, assuming the heat source is operating properly and has been set properly. If the thermometer 10 indicates that the temperature (and consequently the pressure) within the closed cooker is rising too slowly or too rapidly, the operator will adjust the source of heat accordingly to obtain the desired pressure (and temperature) at the end of the proper length of time. Furthermore it is frequently desirable with certain foods to hold a pressure within the cooker for a predetermined length of time after said pressure has been obtained. The housewife may reset the valve 8, and, observing the thermometer 10, she may adjust the source of heat to maintain said pressure.

The relief valve 8, in accordance with my invention, comprises a tubular body 11 having a reduced threaded end portion 12 for threading with a steam-tight fit in an opening provided therefor in the cover 5. The smooth circular bore 13 of the body 11 communicates at its lower end with the small co-axial orifice 14 provided in the end portion 12, a tapered valve seat 15 being provided at the inner end of the orifice for cooperation with the tapered end of the longitudinally reciprocable relief valve 16. This relief valve is herein directly weighted by the cylindrical weight 17, to which it is suitably rigidly attached, the weight 17 being, of course, slidable freely in the bore 13. Additional weights, in whatever number desired, are also assembled in the bore 13 and adapted to be used selectively, one or more at a time, to supplement the weight 17 to obtain whatever aggregate weight is desired, within the limits of the unit, and accordingly predetermine higher pressures at which the relief valve 16 will open. In the present case two such additional cylindrical weights 18 and 19 are provided, both, of course, freely slidable in the bore 13, above the weight 17. There are diametrically opposed longitudinal slots 20 in the body 11, and through these slots the weights 17—19 have their operating handles 17a—19a projecting for convenient manipulation of the weights in setting the valve 18 or opening the same. There are diametrically opposed notches or bayonet slots 21 and 22 opening from the slots 20 at two elevations above the level of the weights 17 in which the handles 18a and 19a of weights 18 and 19 can be quickly releasably engaged for support of these weights in raised retracted positions relative to the weight 17. The notches are spaced far enough apart so that the uppermost weight 19 will not interfere with the manipulation of the weight 18 if only that weight is to be lowered to rest on the weight 17. The downward inclination of slots 21 and 22 necessitates a slight amount of lifting of the weights in withdrawing the handles from the slots. This is to avoid danger of the weights dropping down accidentally. It will also be seen that the slots 20 extend down far enough below the handles 17a to insure proper seating of valve 16.

In operation, assuming that the mass of weight 17 is such that valve 16 will open at five pounds pressure, then the housewife can set the valve 18 accordingly, with only this lowermost weight in operative position if she desires to have the warning whistle 9 sounded when that pressure is obtained the whistle 9 having its bore 23 in open communication with the lower end of bore 20 so as to be sounded by the escaping steam when valve 16 opens. When the pressure cooker is used for canning it is operated sometimes at five pounds pressure and other times at ten pounds pressure, depending on the kind of food being prepared. Hence, assuming that the mass of weight 18 added to weight 17 is enough to keep the valve 16 closed up to a pressure of ten pounds, the housewife places weight 18 in operative position on top of weight 17 for operation at that pressure. For some other foods requiring higher pressures to be cooked thoroughly, the third weight 19 may be placed on top of weights 17 and 18 to keep the valve 16 closed up to a pressure of say 15 pounds, assuming the mass of the three weights is equivalent to such an internal pressure in the cooker. Obviously as many additional weights may be provided as needed for as wide a range of pressures as a given cooker may be designed. When the pressure in the cooker is to be relieved, as previously mentioned, the weight or weights can be raised by means of the handle or handles 17a, the fit of the weight 17 in bore 13 being close enough to avoid danger of steam escaping past the weight 17 through slots 20 and scalding the operator's fingers. Practically all of the steam will escape through whistle 9 whenever valve 16 is opened. The handles 17a—19a may be, and preferably are, of non-conducting material pressed into or otherwise suitably secured in holes 24 provided therefor in diametrically opposite sides of the bodies of the weights 17—19, to further reduce likelihood of the operator burning her fingers. The upper end of the body 11 is closed by a cap 25 pinned, as at 26, or otherwise suitably secured in place.

It is believed the foregoing description conveys a good understanding of the objects and advantages of my invention. The appended claims have been drawn to cover all legitimate modifications and adaptations.

I claim:

1. A valve comprising a tubular body having a restricted orifice in one end and a valve seat at the inner end of said orifice, a reciprocable valve member in said body arranged to engage the valve seat by gravity, said body having a longitudinal slot provided therein, a weight reciprocable in said body and supported by said valve member predetermining a pressure in the orifice necessary to unseat the valve member, an operating handle projecting from said weight through said slot to permit manually lifting said weight to unseat said valve member from outside said body independently of the pressure in said orifice, at least one other weight reciprocable in said body and adapted to rest on the first weight to predetermine by the aggregate weight of the weights a higher pressure in the orifice necessary to unseat the valve member, said body having a bayonet slot provided therein communicating with the longitudinal slot, and an operating handle on the second weight projecting therefrom for engagement selectively in either of said slots, the bayonet slot being so located as to elevation in relation to said first weight for support of the other weight in raised retracted position when the handle on said other weight is engaged in said bayonet slot.

2. A valve as set forth in claim 1, wherein the operating handle on at least the first weight is of non-conducting material.

3. A valve comprising a tubular body having a restricted orifices in one end and a valve seat at the inner end of said orifice, a reciprocable valve member in said body arranged to engage the valve seat by gravity, said body having two longitudinal slots provided therein on diametrically opposite sides, a weight reciprocable in said body and supported by said valve member predetermining a pressure in the orifice necessary to unseat the valve member, a pair of operating handles projecting from said weight on diametrically opposite sides and operable in said slots to permit manually lifting said weight to unseat said valve member from outside said body independently of the pressure in said orifice, at least one other weight reciprocable in said body and adapted to rest on the first weight to predetermine by the aggregate weight of the weights a higher pressure in the orifice necessary to unseat the valve member, said body having bayonet slots provided therein on diametrically opposite sides communicating with the longitudinal slots, and a pair of operating handles on the second weight projecting therefrom on diametrically opposite sides for engagement selectively in either the longitudinal slots or bayonet slots, the bayonet slots being so located as to elevation in relation to said first weight for support of the other weight in raised retracted position when the handles on said other weight are engaged in said bayonet slots.

4. A valve as set forth in claim 1, wherein the operating handles on the weights are of non-conducting material.

5. A valve comprising a tubular body having a restricted orifice in one end and a valve seat at the inner end of said orifice, a reciprocable valve member in said body arranged to engage the valve seat by gravity, said body having a longitudinal slot provided therein, a weight reciprocable in said body and supported by said valve member predetermining a pressure in the orifice necessary to unseat the valve member, at least one other weight reciprocable in said body and adapted to rest on the first weight to predetermine by the aggregate weight of the weights a higher pressure in the orifice necessary to unseat the valve member, said body having a bayonet slot provided therein communicating with the longitudinal slot, and an operating handle on the second weight projecting therefrom for engagement selectively in either of said slots, the bayonet slot being so located as to elevation in relation to said first weight for support of the other weight in raised retracted position when the handle on said other weight is engaged in said bayonet slot.

6. A valve as set forth in claim 5, wherein the operating handle on said last mentioned weight is of non-conducting material.

7. A valve comprising a tubular body having a restricted orifice in one end and a valve seat at the inner end of said orifice, a reciprocable valve member in said body arranged to engage the valve seat by gravity, said body having two longitudinal slots provided therein on diametrically opposite sides, a weight reciprocable in said body and supported by said valve member predetermining a pressure in the orifice necessary to unseat the valve member, at least one other weight reciprocable in said body and adapted to rest on the first weight to predetermine by the aggregate weight of the weights a higher pressure in the orifice necessary to unseat the valve member, said body having bayonet slots provided therein on diametrically opposite sides communicating with the longitudinal slots, and a pair of operating handles on the second weight projecting therefrom on diametrically opposite sides for engagement selectively in either the longitudinal slots or bayonet slots, the bayonet slots being so located as to elevation in relation to said first weight for support of the other weight in raised retracted position when the handles on said other weight are engaged in said bayonet slots.

ERIK G. GRUNDSTROM.

REFERENCES CITED

The following references are of record in the file of this patent:

UNITED STATES PATENTS

| Number | Name | Date |
| --- | --- | --- |
| 80,461 | Davis | July 28, 1868 |
| 686,976 | Kelly | Nov. 19, 1901 |
| 1,474,192 | Gessler | Nov. 13, 1923 |
| 2,200,903 | Stephens | May 14, 1940 |
| 2,294,746 | Grundstrom | Sept. 1, 1942 |